United States Patent [19]

Koyama et al.

[11] 4,448,940

[45] May 15, 1984

[54] THERMOSETTING RESIN COMPOSITION AND PREPOLYMER THEREOF

[75] Inventors: Tohru Koyama; Motoyo Wajima; Junji Mukai, all of Hitachi, Japan

[73] Assignee: Hitachi, Ltd., Tokyo, Japan

[21] Appl. No.: 436,720

[22] Filed: Oct. 26, 1982

[30] Foreign Application Priority Data

Oct. 30, 1981 [JP] Japan ................................. 56-172732

[51] Int. Cl.$^3$ ............................................ C08G 59/40
[52] U.S. Cl. ...................................... 525/504; 528/89; 528/90; 528/91; 528/92; 528/98; 528/99; 528/119; 528/361; 528/362
[58] Field of Search .................... 528/119, 362, 89, 90, 528/91, 92, 98, 99, 361; 525/504

[56] References Cited

U.S. PATENT DOCUMENTS 2,753,323  7/1956  Farnham ............................ 528/97 X
3,091,595  5/1963  Mika .................................. 528/119 X
4,379,728  4/1983  Lin .................................... 528/119 X

*Primary Examiner*—Earl A. Nielsen
*Attorney, Agent, or Firm*—Antonelli, Terry & Wands

[57] ABSTRACT

A thermosetting resin composition comprising (A) at least one polyfunctional epoxy compound and (B) at least one polyfunctional nitrile compound and a prepolymer thereof can give a cured product having excellent heat resistance and mechanical properties such as flexibility.

16 Claims, No Drawings

THERMOSETTING RESIN COMPOSITION AND PREPOLYMER THEREOF

This invention relates to a thermosetting resin composition and a prepolymer thereof giving a cured article having oxazoline rings and/or cyanurate rings in the molecular structure and heat resistance of class C (180° C. or higher).

With recent progress of making the capacity larger with miniaturization and weight-saving in electric machines and devices such as electrical rotating machines, thermosetting resins with remarkably excellent heat resistance have been demanded. On one hand, it is known that polycyanurate is excellent in heat resistance by D. R. Anderson and J. M. Holovka, J. Polym. Sci., A1(4), 1689–1702 (1966). This polycyanurate is obtained by trimerization reaction of a polyfunctional nitrile compound as shown in the following equation (I):

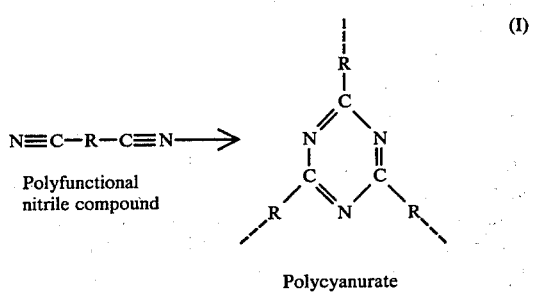

Polyfunctional nitrile compound

Polycyanurate

Since the reaction of the equation (I) is an addition reaction without accompanying the generation of volatile materials, the resulting cured product does not contain voids therein and is suitable as electrical insulating material with high heat resistance. But the polycyanurate having only cyanurate rings is very brittle, and thus it is not suitable for practical use.

It is objects of this invention to provide a thermosetting resin composition and a prepolymer thereof giving cured products excellent both in heat resistance and flexibility.

This invention provides a thermosetting resin composition comprising (A) at least one polyfunctional epoxy compound having two or more 1,2-epoxy groups and (B) at least one polyfunctional nitrile compound having two or more nitrile groups.

This invention also provides a prepolymer obtained by preliminarily reacting a thermosetting resin composition comprising (A) at least one polyfunctional epoxy compound having two or more 1,2-epoxy groups and (B) at least one polyfunctional nitrile compound having two or more nitrile groups to the B stage.

The curing mechanism of the composition of the invention seems to be represented by the following equations (II) and (III), or (IV) and (V). That is, if the amount of the polyfunctional nitrile compound is more than 1 equivalent per equivalent of the polyfunctional epoxy compound, oxazoline rings are first formed as shown by the equation (II), and then cyanurate rings are formed as shown by the equation (III), followed by three-dimensional crosslinking.

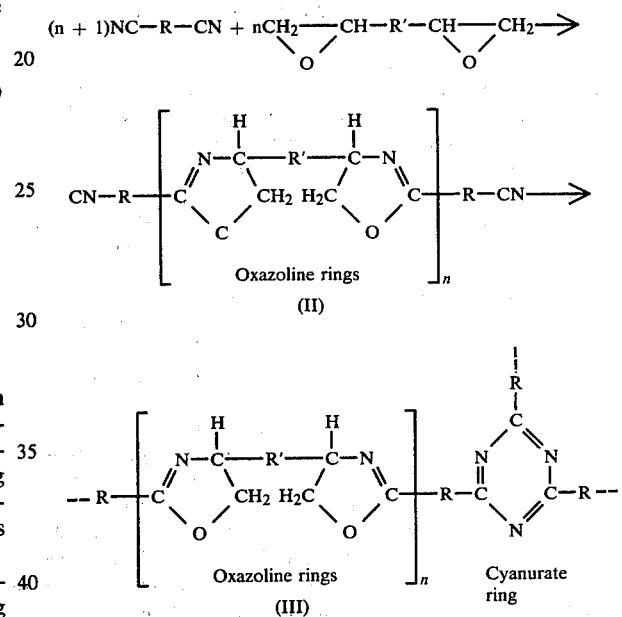

On the other hand, if the amount of the polyfunctional nitrile compound is less than 1 equivalent per equivalent of the polyfunctional epoxy compound, oxazoline rings are formed first as shown by the equation (IV), followed by polymerization reaction of the epoxy groups as shown by the equation (V).

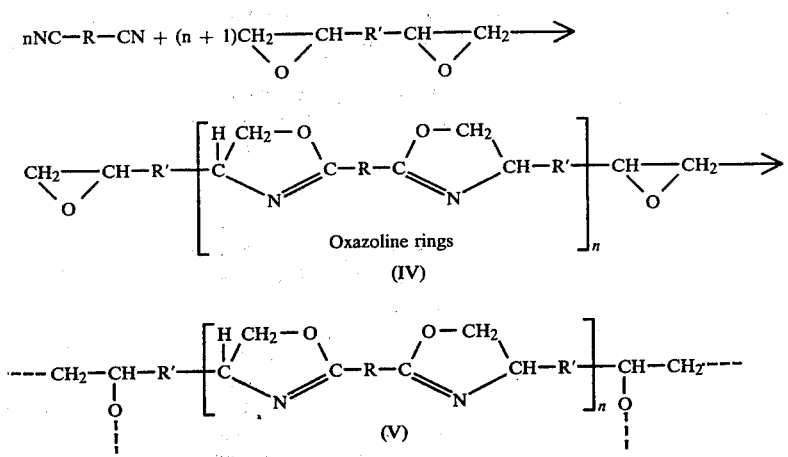

When the two are present in equal equivalent, oxazoline rings seem to be formed mainly.

In the above reaction equations, each bifunctional compound is used for simplicity, but this invention is not limited thereto.

As to polyfunctional epoxy compounds, there can be used any epoxy compounds having two or more 1,2-epoxy groups. Preferable examples of these epoxy compounds are bifunctional epoxy compounds such as diglycidyl ether of bisphenol A, butadiene diepoxide, 3,4-epoxycyclohexylmethyl-(3,4-epoxy)cyclohexane carboxylate, vinylcyclohexene dioxide, 4,4'-bis(1,2-epoxyethyl)diphenyl ether, 4,4'-bis(1,2-epoxyethyl)-biphenyl, 2,2-bis(3,4-epoxycyclohexyl)propane, diglycidyl ether of resorcin, bis(2,3-epoxycyclopentyl) ether, 2-(3,4-epoxy)cyclohexane-5,5-spiro(3,4-epoxy)cyclohexane-m-dioxane, bis(3,4-epoxy-6-methylcyclohexyl) adipate, N,N'-m-phenylenebis(4,5-epoxy-1,2-cyclohexane dicarboxyimide), etc.; tri- or higher functional epoxy compounds such as triglycidyl ether of aminophenol, triglycidyl ether of phloroglucin, triglycidyl ether of methylphloroglucin, polyallyl glycidyl ether, 1,3,5-tri(1,2-epoxyethyl)benzene, 2,2',4,4'-tetraglycidoxybenzophenone, tetraglycidoxytetraphenylmethane, polyglycidyl ether of phenol-formaldehyde novolak, triglycidyl ether of trimethylolpropane, etc. These epoxy compounds can be used alone or as a mixture thereof.

Among them, diglycidyl ether of bisphenol A, polyglycidyl ether of phenol-formaldehyde novolak, etc., are more preferable.

As the polyfunctional nitrile compounds, there can be used any nitrile compounds having at least two nitrile groups. Preferable examples of these nitrile compounds are orthophthalonitrile, isophthalonitrile, terephthalonitrile, 3-methyl-1,4-dicyanobenzene, 5-isopropyl-1,3-dicyanobenzene, 2,5-dimethyl-1,4-dicyanobenzene, 2-chloro-1,3-dicyanobenzene, 5-bromo-1,4-dicyanobenzene, 5-amino-1,3-dicyanobenzene, 3-nitro-1,2-dicyanobenzene, 2-carboxy-1,4-dicyanobenzene, 2-dichloromethyl-1,3-dicyanobenzene, 2-ethyl-3-chloro-1,4-dicyanobenzene, 2-ethyl-3-chloro-1,4-dicyanobenzene, 4-hydroxy-1,3-dicyanobenzene, 2-n-octyl-1,4-dicyanobenzene, 3-nitro-1,2-dicyanobenzene, 1,3,5-tricyanobenzene, 2-chloro-1,3,5-tricyanobenzene, 3-fluoro-1,4,5-tricyanobenzene, 6-nitro-1,3,5-tricyanobenzene, 2-hydroxy-3,4,5-tricyanobenzene, 4-methyl-1,3,5-tricyanobenzene, 1,2,4,5-tetracyanobenzene, 3-hydroxy-1,2,4,5-tetracyanobenzene, 2-bromo-1,3,4,5-tetracyanobenzene, 3-nitro-1,2,4,5-tetracyanobenzene, 2-isopropyl-1,3,4,5-tetracyanobenzene, 3-n-pentyl-1,2,4,5-tetracyanobenzene, 5-chloromethyl-2-ethyl-3-chloro-1,4-dicyanobenzene, 4,4'-dicyanobiphenyl, 4,4'-dicyanobiphenyl ether, 4,4'-dicyanobiphenylmethylene, 4,4'-dicyanobiphenylsulfone, 4,4'-dicyanobiphenylsulfide, 1,4-bis(p-phenoxybenzoyl)-2,5-dicyanobenzene, 4,4'-bis[p-(p-cyanobenzoyl)phenoxybenzenesulfonyl]-diphenyl ether, 1,3-bis[p-(p-cyanobenzoyl)phenoxybenzoyl]benzene, 1,3-bis[p-(p-cyanobenzoyl)phenoxybenzenesulfonyl]benzene, 1,3-bis(3,4-dicyanophenoxy)benzene, 1,4-bis(3,4-dicyanophenoxy)benzene, 4,4'-bis(3,4-dicyanophenoxy)biphenyl, 4,4'-bis(3,4-dicyanophenoxy)biphenylsulfone, 4,4'-bis(3,4-dicyanophenoxy)biphenylmethane, 4,4'-bis(3,4-dicyanophenoxy)biphenylpropane, 4,4'-bis(3,4-dicyanophenoxy)biphenylhexafluoropropane, etc. These bifunctional or higher functional nitrile compounds can be used alone or as a mixture thereof. When the polyfunctional nitrile compound is used in 100 equivalents or more per equivalent of the polyfunctional epoxy compound, there is a tendency to make the properties of the cured product remarkably brittle. When the polyfunctional nitrile compound is used in 0.01 equivalent or less per equivalent of the polyfunctional epoxy compound, there is a tendency to make the heat resistance of the cured product lower. Particularly, when the polyfunctional nitrile compound is used within a range of 0.05 to 60 equivalents, a good result is obtained in respect of thermal stability and mechanical performance at temperatures of 200° C. or higher.

The composition of this invention can be cured with heating, preferably at 200° C. or higher. But by using the following curing agent or agents, the curing properties can be improved and the curing can be conducted at lower temperatures with shorter time. The curing catalyst usable in this invention is one that can form both cyanurate rings and oxazoline rings or only oxazoline rings.

Examples of such a curing catalyst are Lewis acids such as boron trifluoride, anhydrous stannic chloride, anhydrous aluminum chloride, anhydrous ferric chloride, anhydrous phosphorus pentachloride, cupric chloride, titanium tetrachloride, etc.; Brönsted acids such as sulfuric acid, p-toluenesulfonic acid, m-xylenesulfonic acid, trifluorosulfonic acid, trichlorosulfonic acid, etc.; combinations of Lewis acids and Brönsted acids such as titanium tetrachloride-hydrochloric acid, zinc chloride-hydrochloric acid, anhydrous lead chloride-hydrochloric acid, anhydrous aluminum chloride-hydrochloric acid, anhydrous phosphorus pentachloride-hydrochloric acid, etc.; boron trifluoride amine complexes such as boron trifluoride monoethylamine complex, boron trifluoride piperidine complex, boron trifluoride imidazole complex, etc.; tetra-substituted borate type compounds of phosphorus, arsenic, antimony, and bismuth represented by the formulae (1) to (6):

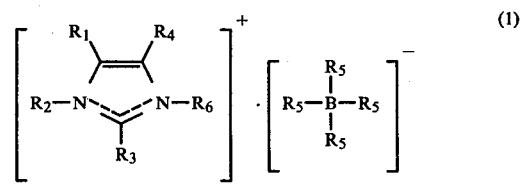

(1)

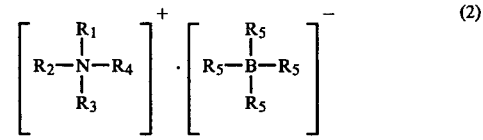

(2)

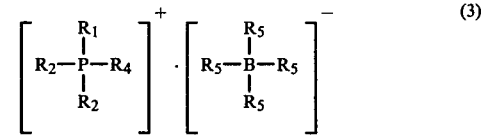

(3)

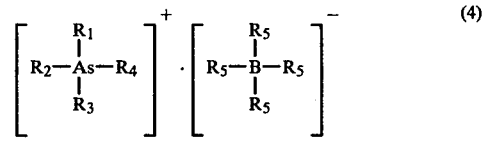

(4)

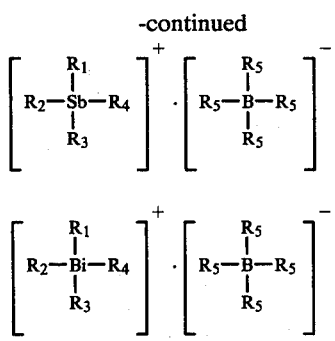

wherein $R_1$, $R_2$, $R_3$, $R_4$ and $R_6$ are independently hydrogen, an alkyl group, an alkenyl group, a phenyl group, or a substituted phenyl group; and $R_5$ is a phenyl group or a substituted phenyl group; Ziegler-Natta catalysts such as titanium tetrachloride-triethylaluminum, titanium tetrachloride-triisobutylaluminum, etc.; metal ferrocyanides such as ferrous ferrocyanide, ferric ferrocyanide, copper ferrocyanide, zinc ferrocyanide, sodium ferrocyanide, potassium ferrocyanide, calcium ferrocyanide, barium ferrocyanide, lithium ferrocyanide, etc.; metal ferricyanides such as ferrous ferricyanide, ferric ferricyanide, copper ferricyanide, sodium ferricyanide, potasium ferricyanide, calcium ferricyanide, magnesium ferricyanide, lithium ferricyanide, etc.; organotin compounds such as tetraphenyltin, dibutyltin sulfide, tributyltin acrylate, triphenyltin chloride, hexabutyldi tin, dibutyldivinyltin, triethyltin chloride, tetraethyltin, dibutyltin diacetate, dioctyltin maleate, triphenyltin hydroxide, tetravinyltin, etc.; organoantimony compounds such as tributylantimony, tributylantimony oxide, triphenylantimony, triphenylanitimony sulfide, etc.; organolead compounds such as tetraphenyllead, etc.; organomercury compounds such as phenylmercuric acetate, disphenylmercury, etc.; organoarsenic compounds such as triphenylarsenic, triphenylarsenic oxide, etc.; organic iron compounds such as ferrocene (bis(cyclopentadienyl)iron(II)), chloromercury ferrocene, acetylferrocene, 1,1-bis(chloromercury) ferrocene, etc.; organotitanium compounds such as bis(cyclopentadienyl)titanium dichloride, tetraisopropyl titanate, tetra-n-butyl titanate, tetrastearyl titanate, tetra(2-ethylhexyl) titanate, butyl titanate dimer, polytetrabutyl titanate, etc.; organozirconium compounds such as bis(cyclopentadienyl)zirconium chloride, tetraisopropyl zirconate, tetra-n-butyl zirconate, tetra-n-pentyl zirconate, tetra-n-hexyl zirconate, tetra-n-octyl zirconate, etc.; organophosphorus compounds such as triphenylphosphine sulfide, dihexylphosphine oxide, trioctylphosphine oxide, triphenylphosphine, etc.; organosilicone compounds such as hexamethyldisilazan, triphenylsilicone azide, etc.; organocobalt compounds such as octacarbonyldicobalt, etc.; organochromium compounds such as hexacarbonyl chromium, tricarbonyl toluyl chromium, etc.; organobismuth compounds such as triphenylbismuth, etc.; organovanadium compounds; organomagnesium compounds; organotungsten compounds; etc. In addition, there can also be used organic amine oxides such as N,N-dimethyl-N-cyclohexylamine oxide, N,N-dimethyl-N-phenylamine oxide, 1,4-dioxo-1,4-diaza[2,2,2]bicyclooctane, phenazine-N-oxide, pyridine-N-oxide, N-methylmorpholine-N-oxide, N-methylpiperidine-N-oxide, trimethylamine oxide, N-ethyl-N-methyl-N-butylamine oxide, etc., hydrochloride adducts of these organic amine oxides, and the like.

Among these curing catalysts, the Lewis acids, boron trifluoride amine complexes, organotin compounds, organobismuth compounds, organotitanium compounds, organozirconium compounds, organoantimony compounds, organolead compounds are particularly preferable.

The amount of the catalyst is not limited strictly. In general, it is preferable to use at least one catalyst in an amount of 0.01 to 10% by weight, more preferably 0.1 to 5% by weight, based on the total weight of the polyfunctional epoxy compound and the polyfunctional nitrile compound.

The composition of this invention can be obtained by mixing at least one polyfunctional epoxy compound and at least one polyfunctional nitrile compound in amounts depending on purposes, followed by the addition of at least one catalyst mentioned above. If required, the composition may contain one or more conventional additives, fillers, pigments, solvents, and the like.

Since the composition of this invention is a solventless type and addition curing type, it can be used in various purposes. When the composition contains one or more curing catalysts, it can easily be cured at 0° C. to 400° C. for 1 to 200 hours. The cured article shows excellent heat resistance, e.g., it can be used at temperatures as high as 250° C. for a long period of time without any change. Further, the cured article is excellent in electrical properties, resistance to chemicals, impact strength and self-extinguishing properties, so that the composition of this invention can widely be used for heat resistant insulating varnishes, casting resins, impregnating resins, molding resins for electronic parts, resins for laminates, resins for printed wiring borads, resins for interior finishing, and the like.

Reasons for obtaining thermoset articles particularly excellent in heat resistance from the composition of this invention seem to be that cured product is consisted of oxazoline rings which are excellent in heat resistance or oxazoline rings and cyanurate rings. Further, the cured product is suitably balanced in the portion very high in crosslinking density of cyanurate rings, the portion of oxazoline rings which have relatively flexibility, and the portion of ether linkages, and thus it is excellent in mechanical properties.

The composition of this invention may further contain one or more monofunctional epoxy compounds and/or monofunctional nitrile compounds so far as these compounds do not lower the effects of this invention.

This invention is illustrated by way of the following Examples.

EXAMPLE 1

Novolak type polyglycidyl ether (DEN 438, a trade name, mfd. by Dow Chemical Co., epoxy equivalent weight 176) in an amount of 87.5 g was mixed well with 109.1 g of 4,4'-dicyanobiphenylmethylene (hereinafter referred to as "DCP"), and 3.0 g of boron trifluoride piperidine complex. The resulting mixture was treated at room temperature for 2 hours and heated at 150° C. for 10 hours to give a prepolymer having a high viscosity with a light yellow color.

Infrared absorption spectrum of the prepolymer showed that the absorption due to the group of $-C \equiv N$ at 2240 cm$^{-1}$ and that due to the epoxy group at 910 cm$^{-1}$, these absorptions being present before the heating, were reduced, while the absorption due to the oxazoline ring at 1650 cm$^{-1}$ appeared newly. This meant that the prepolymer mainly contained oxazoline rings.

The prepolymer was heated at 200° C. for 5 hours and at 250° C. for 10 hours to give a cured product.

Infrared absorption spectrum of the cured product showed that the absorption due to the group of —C≡N at 2230 cm$^{-1}$ and that due to the epoxy group at 910 cm$^{-1}$, these absorptions being present before the curing, were further reduced, while the absorption due to the cyanurate ring appeared at 1510 cm$^{-1}$ newly and the absorption due to the oxazoline ring at 1650 cm$^{-1}$ became stronger. This meant that the cured product was a polymer having mainly cyanurate rings and oxazoline rings. The resulting cured product was a reddish brown resin having a temperature for beginning the weight loss in a nitrogen atmosphere of 395° C.

The cured product had very excellent heat resistance and electrical properties as shown in Table 1.

TABLE 1

| Tensile strength (kg/cm$^2$) (measured at 250° C.) | | 500 |
|---|---|---|
| Elongation (%) (measured at 250° C.) | | 5.8 |
| Electric properties (measured at 250° C.) | Dielectric loss tangent, tan δ (%) | 2.3 |
| | Dieletric constant ε | 4.1 |
| | Specific volume resistance ρ (Ω · cm) | 4 × 10$^{12}$ |
| Properties | Tensile strength (kg/cm$^2$) | 480 |

TABLE 1-continued

| after deteriorated at 250° C. for 20 days | (measured at 250° C.) | |
|---|---|---|
| | Elongation (%) (measured at 250° C.) | 5.5 |
| | Weight loss (%) | 3.9 |

EXAMPLES 2 TO 14

Novolak type polyglycidyl ether (DEN 431, mfd. by Dow Chemical Co., epoxy equivalent weight 175) in an amount of 87.5 g was mixed well with 109.1 g of DCP and a curing catalyst as shown in Table 2. The resulting mixture was heated at 80° C. for 10 hours, 150° C. for 10 hours and 250° C. for 10 hours to give a cured product. Infrared absorption spectrum of the cured product was the same as that of Example 1, which meant that the cured product was a polymer containing mainly cyanurate rings and oxazoline rings. The cured product was a reddish brown resin having a temperature for beginning the weight loss in a nitrogen atmosphere of 370°–410° C.

The cured product had the same excellent electrical properties as those of Example 1 and also had excellent mechanical properties and heat resistance as shown in Table 3.

TABLE 2

| Composition | | Example No. | | | | | | |
|---|---|---|---|---|---|---|---|---|
| | | 2 | 3 | 4 | 5 | 6 | 7 | 8 |
| DEN 431 | (g) | 87.5 | 87.5 | 87.5 | 87.5 | 87.5 | 87.5 | 87.5 |
| DCP | (g) | 109.1 | 109.1 | 109.1 | 109.1 | 109.1 | 109.1 | 109.1 |
| Bron trifluoride-monoethylamine complex | (g) | 3.0 | | | | | | |
| Titanium tetrachloride-triethylamuminum | (g) | | 3.0 | | | | | |
| Tetraphenyltin | (g) | | | 3.0 | | | | |
| Dioctyltin maleate | (g) | | | | 3.0 | | | |
| Tributylantimony | (g) | | | | | 3.0 | | |
| Bis(cyclopentadienyl)titanium dichloride | (g) | | | | | | 3.0 | |
| Triphenylbismuth | (g) | | | | | | | 3.0 |
| Tetraethyl zirconate | (g) | | | | | | | |
| Tetraphenyllead | (g) | | | | | | | |
| Triethylamine-tetraphenyl borate | (g) | | | | | | | |
| 2-Ethyl-4-methylimidazole tetraphenyl borate | (g) | | | | | | | |
| Boron trifluoride-ether complex | (g) | | | | | | | |
| Trifluorosulfonic acid | (g) | | | | | | | |
| | | 9 | 10 | 11 | 12 | 13 | 14 | |
| DEN 431 | (g) | 87.5 | 87.5 | 87.5 | 87.5 | 87.5 | 87.5 | |
| DCP | (g) | 109.1 | 109.1 | 109.1 | 109.1 | 109.1 | 109.1 | |
| Bron trifluoride-monoethylamine complex | (g) | | | | | | | |
| Titanium tetrachloride-triethylamuminum | (g) | | | | | | | |
| Tetraphenyltin | (g) | | | | | | | |
| Dioctyltin maleate | (g) | | | | | | | |
| Tributylantimony | (g) | | | | | | | |
| Bis(cyclopentadienyl)titanium dichloride | (g) | | | | | | | |
| Triphenylbismuth | (g) | | | | | | | |
| Tetraethyl zirconate | (g) | 3.0 | | | | | | |
| Tetraphenyllead | (g) | | 3.0 | | | | | |
| Triethylamine-tetraphenyl borate | (g) | | | 3.0 | | | | |
| 2-Ethyl-4-methylimidazole tetraphenyl borate | (g) | | | | 3.0 | | | |
| Boron trifluoride-ether complex | (g) | | | | | 3.0 | | |
| Trifluorosulfonic acid | (g) | | | | | | 3.0 | |

TABLE 3

| Properties of cured product | | Example No. | | | | | | |
|---|---|---|---|---|---|---|---|---|
| | | 2 | 3 | 4 | 5 | 6 | 7 | 8 |
| Initial value | Tensile strength* (kg/cm$^2$) | 512 | 482 | 420 | 430 | 450 | 480 | 465 |
| | Elongation* (%) | 6.1 | 5.8 | 5.3 | 5.4 | 5.4 | 5.6 | 5.4 |
| Properties after deterio- | Tensile strength* (kg/cm$^2$) | 501 | 470 | 402 | 401 | 423 | 435 | 432 |
| | Elongation* (%) | 5.8 | 4.7 | 4.1 | 4.5 | 4.3 | 4.2 | 4.3 |

TABLE 3-continued

| Properties of cured product | | Example No. | | | | | |
|---|---|---|---|---|---|---|---|
| rated at 250° C. days 20 days | Weight loss (%) | 4.1 | 3.9 | 4.2 | 4.1 | 3.8 | 4.3 | 4.2 |

| | | 9 | 10 | 11 | 12 | 13 | 14 |
|---|---|---|---|---|---|---|---|
| Initial value | Tensile strength* (kg/cm$^2$) | 440 | 490 | 508 | 492 | 433 | 412 |
| | Elongation* (%) | 5.4 | 5.9 | 5.8 | 5.7 | 5.2 | 5.1 |
| Properties after deteriorated at 250° C. for 20 days | Tensile strength* (kg/cm$^2$) | 420 | 460 | 482 | 453 | 389 | 385 |
| | Elongation* (%) | 5.1 | 5.1 | 5.3 | 5.1 | 4.5 | 4.2 |
| | Weight loss (%) | 4.1 | 4.0 | 3.9 | 4.2 | 4.3 | 4.5 |

Note
*Measured at 250° C.

EXAMPLES 15 TO 21

Resin compositions were prepared by mixing 87.5 g of DEN 438 used in Example 1, 1% by weight of boron trifluoride piperidine complex and DCP in an amount as listed in Table 4 from 66.0 g to 300.0 g. The resulting resin compositions were treated at room temperature for 2 hours, and heated at 150° C. for 10 hours, 200° C. for 5 hours and 250° C. for 5 hours to give cured products. The cured products obtained were resins colored in reddish brown. Cured products had substantially the same electrical properties as shown in Example 1 and had mechanical properties and excellent heat resistance as shown in Table 4.

EXAMPLES 22 TO 25

Resin compositions were prepared by mixing 87.5 g of DEN 438 used in Example 1 or diglycidyl ether of bisphenol A (DER 332, a trade name, mfd. by Dow Chemical Co., epoxy equivalent weight 174), 1% by weight of boron trifluoride piperidine complex and a polyfunctional nitrile compound as shown in Table 5. The resulting resin compositions were treated at room temperature for 2 hours and heated at 150° C. for 10 hours, 200° C. for 5 hours and 250° C. for 5 hours to give cured products. The cured products obtained were resins colored in reddish brown. The cured products had substantially the same electrical properties as shown in Example 1 and had mechanical properties and excellent heat resistance as shown in Table 5.

TABLE 4

| | | | Example No. | | | | | | |
|---|---|---|---|---|---|---|---|---|---|
| | | | 15 | 16 | 17 | 18 | 19 | 20 | 21 |
| Composition | DEN 438 | (g) | 87.5 | 87.5 | 87.5 | 87.5 | 87.5 | 87.5 | 87.5 |
| | DCP | (g) | 66.0 | 150.0 | 300.0 | 500.0 | 1000.0 | 2000.0 | 3000.0 |
| | Brontrifluoride-piperidine complex | (g) | 1.5 | 2.4 | 3.9 | 5.9 | 10.9 | 20.9 | 30.9 |
| Properties of cured product | Initial values | Tensile strength* (kg/cm$^2$) | 430 | 530 | 550 | 590 | 620 | 750 | 760 |
| | | Elongation* (%) | 6.1 | 5.8 | 5.5 | 5.3 | 5.1 | 4.2 | 3.5 |
| | Properties after deteriorated at 250° C. for 20 days | Tensile strength* (kg/cm$^2$) | 390 | 521 | 532 | 560 | 580 | 630 | 650 |
| | | Elongation* (%) | 5.7 | 5.2 | 4.9 | 4.8 | 4.6 | 3.7 | 2.8 |
| | | Weight loss (%) | 6.1 | 4.2 | 3.9 | 3.7 | 3.5 | 3.2 | 3.1 |

Note
*Measured at 250° C.

TABLE 5

| | | Example No. | | | |
|---|---|---|---|---|---|
| | | 22 | 23 | 24 | 25 |
| Composition | Polyfunctional epoxy compound (g) | DEN 438 87.5 | DEN 438 87.5 | DEN 438 87.5 | DER 332 87.5 |
| | Polyfunctional nitrile compound (g) | Terephthalonitrile 250.0 | 4,4'-Bis(3,4-dicyanophenoxy)-biphenylmethane 600.00 | 4,4'-Bis(3,4-dicyanophenoxy)-biphenyl sulfone 600.0 | 1,4-Bis(p-phenoxybenzoyl)-2,5-dicyanobenzene 1500.0 |
| | Boron trifluoride-piperdine complex (g) | 3.4 | 6.9 | 6.9 | 15.9 |
| Properties of cured product | Initial value Tensile strength* (kg/cm$^2$) | 560 | 570 | 620 | 530 |
| | Elongation* (%) | 5.2 | 6.3 | 5.1 | 4.5 |
| | Properties after deteriorated at Tensile strength* (kg/cm$^2$) | 490 | 430 | 520 | 460 |
| | Elongation* (%) | 4.1 | 4.3 | 4.2 | 3.2 |
| | Weight loss | 5.3 | 3.2 | 2.3 | 1.8 |

TABLE 5-continued

|  |  | Example No. | | | |
| --- | --- | --- | --- | --- | --- |
|  |  | 22 | 23 | 24 | 25 |
| 250° C. for 20 days | (%) | | | | |

Note
*Measured at 250° C.

COMPARATIVE EXAMPLES 1 AND 2

To 100 g of terephthalonitrile, 100 g of DCP used in Example 1 and 2.0 g of boron trifluoride piperidine complex were added, mixed and treated at room temperature for 2 hours, and heated at 150° C. for 10 hours, 200° C. for 5 hours and 250° C. for 5 hours to give cured products. The cured products were reddish brown resins. Infrared spectra of the cured products showed decreased absorption due to the —C≡N group at 2240 cm$^{-1}$, said absorption being present before curing, and newly showed the absorption due to the cyanurate ring at 1510 cm$^{-1}$. These facts showed that the cured products were polymers having cyanurate rings. Since the cured products were brittle, electrical properties and mechanical properties could not be measured.

EXAMPLES 26 TO 37

Resin compositions were prepared by well mixing 87.5 g of DEN 438 used in Example 1, 27.3 g of DCP and a curing catalyst as listed in Table 6. The resulting resin compositions were heated at 80° C. for 10 hours, 150° C. for 10 hours and 200° C. for 10 hours to give cured products. Infrared spectra of the cured products showed decreased absorption due to the —C≡N group at 2240 cm$^{-1}$, and also decreased absorption due to the epoxy group at 910 cm$^{-1}$, these absorptions being present before curing, and newly showed the absorption due to the oxazoline ring at 1650 cm$^{-1}$. These facts showed that the cured products were polymers having oxazoline rings.

Mechanical properties and electrical properties of the cured products were very excellent as shown in Table 7.

TABLE 6

|  |  |  | Example No. | | | | | | | | | | | |
| --- | --- | --- | --- | --- | --- | --- | --- | --- | --- | --- | --- | --- | --- | --- |
|  |  |  | 26 | 27 | 28 | 29 | 30 | 31 | 32 | 33 | 34 | 35 | 36 | 37 |
| Composition | DEN 438 | (g) | 87.5 | 87.5 | 87.5 | 87.5 | 87.5 | 87.5 | 87.5 | 87.5 | 87.5 | 87.5 | 87.5 | 87.5 |
|  | DCP | (g) | 27.3 | 27.3 | 27.3 | 27.3 | 27.3 | 27.3 | 27.3 | 27.3 | 27.3 | 27.3 | 27.3 | 27.3 |
|  | Boron trifluoride-piperidine complex | (g) | 3.0 | | | | | | | | | | | |
|  | Titanium tetrachloride-triethylaluminum; 2-Ethyl-4-methylimidazole | (g) | | 20;20 | | | | | | | | | | |
|  | Tetraphenyltin; 2-Ethyl-4-methylimidazole | (g) | | | 20;20 | | | | | | | | | |
|  | Dioctyltin maleate; 2-Ethyl-4-methylimidazole | (g) | | | | 20;20 | | | | | | | | |
|  | Tributylantimony; 2-Ethyl-4-methylimidazole | (g) | | | | | 20;20 | | | | | | | |
|  | Bis(cyclopentadienyl)titanium dichloride | (g) | | | | | | 2.0 | | | | | | |
|  | Triphenylbismuth; 2-Ethyl-4-methylimidazole | (g) | | | | | | | 20;20 | | | | | |
|  | Tetraethyl zirconium | (g) | | | | | | | | 2.0 | | | | |
|  | Triethylamine; tetraphenyl borate | (g) | | | | | | | | | 2.0 | | | |
|  | 2-Ethyl-4-methylimidazole; Tetraphenyl borate | (g) | | | | | | | | | | 2.0 | | |
|  | Boron trifluoride-ether complex | (g) | | | | | | | | | | | 2.0 | |
|  | Trifluorosulfone | (g) | | | | | | | | | | | | 2.0 |

TABLE 7

|  |  |  | Example No. | | | | | |
| --- | --- | --- | --- | --- | --- | --- | --- | --- |
|  |  |  | 26 | 27 | 28 | 29 | 30 | 31 |
| Properties of cured product | Initial value | Tensile strength* (kg/cm$^2$) | 490 | 471 | 410 | 430 | 440 | 400 |
|  |  | Elongation* (%) | 5.9 | 5.7 | 5.1 | 5.4 | 5.4 | 5.0 |
|  |  | Dielectric loss tangent* (%) | 4.0 | 5.8 | 6.2 | 4.8 | 5.2 | 6.2 |
|  |  | Dielectric constant* | 3.8 | 4.0 | 3.9 | 4.2 | 4.2 | 3.9 |
|  |  | Specific volume resistance* (Ω·cm) | $1.8 \times 10^{12}$ | $3.5 \times 10^{12}$ | $4.2 \times 10^{12}$ | $4.3 \times 10^{12}$ | $3.8 \times 10^{12}$ | $4.0 \times 10^{12}$ |
|  | Properties after deteriorated at 200° C. for 20 days | Tensile strength* (kg/cm$^2$) | 420 | 410 | 370 | 380 | 360 | 370 |
|  |  | Elongation* (%) | 5.2 | 5.1 | 4.1 | 3.9 | 3.8 | 3.9 |
|  |  | Weight loss (%) | 2.3 | 2.5 | 2.6 | 2.4 | 2.5 | 2.3 |

|  |  |  | Example No. | | | | | |
| --- | --- | --- | --- | --- | --- | --- | --- | --- |
|  |  |  | 32 | 33 | 34 | 35 | 36 | 37 |
| Properties of cured product | Initial value | Tensile strength* (kg/cm$^2$) | 420 | 430 | 420 | 480 | 480 | 400 |
|  |  | Elongation* (%) | 4.9 | 5.0 | 5.1 | 5.6 | 5.4 | 4.9 |
|  |  | Dielectric loss tangent* (%) | 8.0 | 6.3 | 8.4 | 4.8 | 5.0 | 4.9 |
|  |  | Dielectric | 4.3 | 3.9 | 3.9 | 3.9 | 4.0 | 4.2 |

TABLE 7-continued

| | | | | | | | |
|---|---|---|---|---|---|---|---|
| | constant* | | | | | | |
| | Specific volume resistance* (Ω · cm) | $4.5 \times 10^{12}$ | $2.3 \times 10^{12}$ | $3.8 \times 10^{12}$ | $4.1 \times 10^{12}$ | $1.9 \times 10^{12}$ | $3.8 \times 10^{12}$ |
| Properties after deteriorated at 200° C. for 20 days | Tensile strength* (kg/cm$^2$) | 380 | 370 | 370 | 420 | 420 | 320 |
| | Elongation* (%) | 4.3 | 4.1 | 4.3 | 5.1 | 4.8 | 4.3 |
| | Weight loss (%) | 2.5 | 2.6 | 2.7 | 2.3 | 2.4 | 2.5 |

Note
*Measured at 200° C.

EXAMPLES 38 TO 41

Resin compositions were prepared by well mixing 87.5 of DEN 438 used in Example 1, 2% by weight of boron trifluoride piperidine complex and DCP in an amount of from 45.0 g to 5.0 g as listed in Table 8. The resulting resin compositions were treated at room temperature for 2 hours and heated at 150° C. for 10 hours and 200° C. for 10 hours to give cured products. The cured products were reddish brown resins. The cured products had substantially the same electrical properties as in Example 26 and excellent mechanical properties and heat resistance as shown in Table 8.

TABLE 8

| | | Example No. | | | |
|---|---|---|---|---|---|
| | | 38 | 39 | 40 | 41 |
| Composition | DEN 438 (g) | 87.5 | 87.5 | 87.5 | 87.5 |
| | DCP (g) | 45.0 | 20.0 | 10.0 | 5.0 |
| | Boron trifluoride-piperidine complex (g) | 2.7 | 2.2 | 2.0 | 1.9 |
| Properties of cured product | Initial value Tensile strength* (kg/cm$^2$) | 550 | 530 | 420 | 350 |
| | Elongation* (%) | 5.8 | 5.5 | 4.7 | 3.5 |
| Properties after deteriorated at 200° C. for 20 days | Tensile strength* (kg/cm$^2$) | 530 | 480 | 380 | 300 |
| | Elongation* (%) | 5.1 | 4.9 | 4.8 | 2.9 |
| | Weight loss (%) | 2.1 | 2.3 | 2.5 | 2.6 |

Note
*Measured at 200° C.

EXAMPLES 42 TO 45

Resin compositions were prepared by well mixing 88.0 g of DEN 438 used in Example 1, 2% by weight of boron trifluoride-piperidine complex and polyfunctional nitrile compounds as shown in Table 9. Each resin composition was heated at 70° C. for 5 hours to give a light yellow prepolymer with a high viscosity.

Infrared absorption spectra of the resulting prepolymers showed decreased absorption due to the —C≡N group at 2240 cm$^{-1}$ and decreased absorption due to the epoxy group at 910 cm$^{-1}$, these absorptions being present before curing, and newly showed the absorption due to the oxazoline ring at 1650 cm$^{-1}$. These facts showed that the prepolymers were those having oxazoline rings.

Then, the prepolymers were heated at 150° C. for 5 hours and 200° C. for 10 hours to give cured products. The cured products were reddish brown resins. The cured products had substantially the same electrical properties as in Example 26 and excellent mechanical properties and heat resistance as shown in Table 9.

TABLE 9

| | | Example No. | | | |
|---|---|---|---|---|---|
| | | 42 | 43 | 44 | 45 |
| Composition | DEN 438 (g) | 88.0 | 88.0 | 88.0 | 88.0 |
| | Polyfunctional nitrile compound | Terephthalonitrile 32.0 | 4,4'-Bis(3,4-dicyanophenoxy)biphenylmethane 40.0 | 4,4'-Bis(3,4-dicyanophenoxy)-biphenyl sulfone 40.0 | 1,4-Bis(p-phenoxybenzoyl)-2,5-dicyanobenzene 40.0 |
| | Boron trifluoride-piperidine complex (g) | 2.4 | 2.6 | 2.6 | 2.6 |
| Properties of cured product | Initial value Tensile strength* (kg/cm$^2$) | 480 | 530 | 620 | 640 |
| | Elongation* (%) | 5.9 | 4.9 | 5.9 | 6.2 |
| Properties after deteriorated at 200° C. for 20 days | Tensile strength* (kg/cm$^2$) | 420 | 500 | 530 | 540 |
| | Elongation* (%) | 5.1 | 4.7 | 5.6 | 5.8 |
| | Weight loss (%) | 2.4 | 2.0 | 2.1 | 1.9 |

Note
*Measured at 200° C.

EXAMPLES 46 TO 58

Resin compositions were prepared by well mixing 176.0 g of DEN used in Example 1, 109.1 g of DCP and catalysts as shown in Table 10. Each resin composition was heated at 80° C. for 10 hours to give a prepolymer having a high viscosity.

Infrared absorption spectra of the resulting prepolymers showed decreased absorption due to the —C≡N group at 2240 cm$^{-1}$ and decreased absorption due to the epoxy group at 910 cm$^{-1}$, these absorptions being present before curing, and newly showed the absorption due to the oxazoline ring at 1650 cm$^{-1}$. These facts showed that the prepolymers were those having oxazoline rings.

Then, the prepolymers were heated at 150° C. for 10 hours and 200° C. for 10 hours to give cured products. The cured products had very excellent electrical properties, mechanical properties and heat resistance as shown in Table 11.

TABLE 10

| | | | Example No. | | | | | | | | | | | |
|---|---|---|---|---|---|---|---|---|---|---|---|---|---|---|
| | | | 46 | 47 | 48 | 49 | 50 | 51 | 52 | 53 | 54 | 55 | 56 | 57 | 58 |
| Composition | DEN 438 | (g) | 176.0 | 176.0 | 176.0 | 176.0 | 176.0 | 176.0 | 176.0 | 176.0 | 176.0 | 176.0 | 176.0 | 176.0 | 176.0 |
| | DCP | (g) | 109.1 | 109.1 | 109.1 | 109.1 | 109.1 | 109.1 | 109.1 | 109.1 | 109.1 | 109.1 | 109.1 | 109.1 | 109.1 |
| | Boron trifluoride-piperidine complex | (g) | 6.0 | | | | | | | | | | | | |
| | Titanium tetrachloride-triethylaluminum | (g) | | 6.0 | | | | | | | | | | | |
| | Tetraphenyltin | (g) | | | 1.0 | | | | | | | | | | |
| | Dioctyltin maleate | (g) | | | | 6.0 | | | | | | | | | |
| | Tributylantimony | (g) | | | | | 6.0 | | | | | | | | |
| | Bis(cyclopentadienyl)titanium dichloride | (g) | | | | | | 6.0 | | | | | | | |
| | Triphenylbismuth | (g) | | | | | | | 6.0 | | | | | | |
| | Tetraphenyl zirconate | (g) | | | | | | | | 6.0 | | | | | |
| | Tetraphenyllead | (g) | | | | | | | | | 6.0 | | | | |
| | Triethylamine-tetraphenyl borate | (g) | | | | | | | | | | 6.0 | | | |
| | 2-Ethyl-4-methylimidazole-tetraphenyl borate | (g) | | | | | | | | | | | 6.0 | | |
| | Trifluorosulfone | (g) | | | | | | | | | | | | 6.0 | |
| | Boron trifluoride-ether complex | (g) | | | | | | | | | | | | | 6.0 |

TABLE 11

| | | | Example No. | | | | | | | | | | | |
|---|---|---|---|---|---|---|---|---|---|---|---|---|---|---|
| | | | 46 | 47 | 48 | 49 | 50 | 51 | 52 | 53 | 54 | 55 | 56 | 57 | 58 |
| Properties of cured product | Initial value | Tensile Strength* (kg/cm$^2$) | 472 | 460 | 400 | 390 | 420 | 410 | 380 | 380 | 390 | 380 | 320 | 410 | 340 |
| | | Elongation* (%) | 5.6 | 4.9 | 4.3 | 5.3 | 4.9 | 3.8 | 4.3 | 4.1 | 4.3 | 5.2 | 4.6 | 4.7 | 4.5 |
| | | Dielectric loss tangent* (%) | 3.3 | 4.5 | 5.2 | 4.8 | 6.0 | 4.2 | 5.3 | 5.9 | 6.2 | 4.3 | 3.8 | 4.1 | 5.1 |
| | Properties after deteriorated at 200° C. 20 days | Tensile strength* (kg/cm$^2$) | 420 | 400 | 380 | 350 | 370 | 320 | 310 | 280 | 290 | 230 | 210 | 290 | 220 |
| | | Elongation* (%) | 5.1 | 4.8 | 4.1 | 3.2 | 2.9 | 2.5 | 2.8 | 3.1 | 2.8 | 2.3 | 2.2 | 3.3 | 2.5 |
| | | Weight loss (%) | 2.3 | 2.5 | 2.8 | 3.3 | 2.6 | 2.3 | 3.2 | 3.3 | 2.8 | 2.4 | 3.3 | 3.4 | 3.5 |

Note
*Measured at 220° C.

As mentioned above, according to this invention there can be obtained the solventless resin composition and prepolymer thereof which can give cured products with excellent properties, particularly in heat resistance and mechanical properties.

What is claimed is:

1. A thermosetting resin composition comprising
   (A) at least one polyfunctional epoxy compound having two or more 1,2-epoxy groups,
   (B) at least one polyfunctional nitrile compound having two or more nitrile groups and
   (C) at least one curing catalyst which can form both cyanurate rings and oxazoline rings or only oxazoline rings during curing of said composition.

2. A thermosetting resin composition according to claim 1, wherein the polyfunctional epoxy compound is diglycidyl ether of bisphenol A or polyglycidyl ether of phenol-formaldehyde novolak.

3. A thermosetting resin composition comprising
   (A) at least one polyfunctional epoxy compound having two or more 1,2-epoxy groups,
   (B) at least one polyfunctional nitrile compound having two or more nitrile groups; said polyfunctional nitrile compound being 4,4'-dicyanobiphenylene, terephthalonitrile, 4,4'-bis(3,4-dicyanophenoxy)biphenylmethane, 4,4'-bis(3,4-dicyanophenoxy)biphenylsulfone or 1,4-bis(p-phenoxybenzoyl)-2,5-dicyanobenzene.

4. A thermosetting resin composition according to claim 1, wherein the component (A) is used within a range of 0.05 to 60 equivalents per equivalent of the component (B) and the component (C) is present in an amount of 0.01 to 10% by weight based on the total weight of the components (A) and (B).

5. A prepolymer obtained by preliminarily reacting a thermosetting resin composition comprising
   (A) at least one polyfunctional epoxy compound having two or more 1,2-epoxy groups,
   (B) at least one polyfunctional nitrile compound having two or more nitrile groups, and
   (C) at least one curing catalyst which can form both cyanurate rings and oxazoline rings or only oxazoline rings, to the B stage.

6. A cured product obtained by heating a thermosetting resin composition comprising
   (A) at least one polyfunctional epoxy compound having two or more 1,2-epoxy groups, and
   (B) at least one polyfunctional nitrile compound having two or more nitrile groups, and
   (C) at least one curing catalyst which can form both cyanurate rings and oxazoline rings or only oxazoline rings, said cured product having oxazoline rings or oxazoline rings and cyanurate rings.

7. A thermosetting resin composition according to claim 1, wherein the polyfunctional nitrile compound is selected from the group consisting of orthophthalonitrile, isophthalonitrile, terephthalonitrile, 3-methyl-1,4-dicyanobenzene, 5-isopropyl-1,3-dicyanobenzene, 2,5-dimethyl-1,4-dicyanobenzene, 2-chloro-1,3-dicyanobenzene, 5-bromo-1,4-dicyanobenzene, 5-amino-1,3-dicyanobenzene, 3-nitro-1,2-dicyanobenzene, 2-carboxyl-1,4-dicyanobenzene, 2-dichloromethyl-1,3-dicyanobenzene, 2-ethyl-3-chloro-1,4-dicyanobenzene, 4-hydroxy-1,3-dicyanobenzene, 2-n-octyl-1,4-dicyanobenzene, 3-nitro-1,2-dicyanobenzene, 1,3,5-tricyanobenzene, 2-chloro-1,3,5-tricyanobenzene, 3-fluoro-1,4,5-tricyanobenzene, 6-nitro-1,3,5-tricyanobenzene, 2-hydroxy-3,4,5-tricyanobenzene, 4-methyl-1,3,5-tricyanobenzene, 1,2,4,5-tetracyanobenzene, 3-hydroxy-1,2,4,5-tetracyanobenzene, 2-bromo-1,3,4,5-tetracyanobenzene, 3-nitro-1,2,4,5-tetracyanobenzene, 2-isopropyl-1,3,4,5-tetracyanobenzene, 3-n-pentyl-1,2,4,5-tetracyanobenzene, 5-chloromethyl-2-ethyl-3-chloro-1,4-dicyanobenzene, 4,4'-dicyanobiphenyl, 4,4'-dicyanobiphenyl ether, 4,4'-dicyanobiphenylmethylene, 4,4'-dicyanobiphenylsulfone, 4,4'-dicyanobiphenylsulfide, 1,4-bis(p-phenoxybenzoyl)-2,5-dicyanobenzene, 4,4'-bis[p-(p-cyanobenzoyl)phenoxybenzenesulfonyl]diphenyl ether, 1,3-bis[p-(p-cyanobenzoyl)phenoxybenzoyl]benzene, 1,3-bis[p-(p-cyanobenzoyl)phenoxybenzenesulfonyl]benzene, 1,3-bis(3,4-dicyanophenoxy)benzene, 1,4-bis(3,4-dicyanophenoxy)benzene, 4,4'-bis(3,4-dicyanophenoxy)biphenyl, 4,4'-bis(3,4-dicyanophenoxy)biphenylsulfone, 4,4'-bis(3,4-dicyanophenoxy)biphenylmethane, 4,4'-bis(3,4-dicyanophenoxy)biphenylpropane, and 4,4'-bis(3,4-dicyanophenoxy)biphenylhexafluoropropane.

8. A thermosetting resin composition according to claim 1, wherein the polyfunctional epoxy compound is selected from the group consisting of diglycidyl ether of bisphenol A, butadiene diepoxide, 3,4-epoxycyclohexylmethyl-(3,4-epoxy)cyclohexane carboxylate, vinylcyclohexane dioxide, 4,4'-bis(1,2-epoxyethyl)diphenyl ether, 4,4'-bis(1,2-epoxyethyl)biphenyl, 2,2-bis(3,4-epoxycyclohexyl)propane, diglycidyl ether of resorcin, bis(2,3-epoxycyclopentyl)ether, 2-(3,4-epoxy)cycloexane-5,5-spiro(3,4-epoxy)cyclohexane-m-dioxane, bis(3,4-epoxy-6-methylcyclohexyl) adipate, N,N'-m-phenylenebis(4,5-epoxy-1,2-cyclohexane dicarboxyimide), and triglycicyl ether of aminophenol, triglycidyl ether of phloroglucin, triglycidyl ether of methylphloroglucin, polyallyl glycidyl ether, 1,3,5-tri(1,2-epoxyethyl)benzene, 2,2',4,4-tetraglycidoxybenzophenone, tetraglycidoxytetraphenylmethane, polyglycidyl ether of phenolformaldehyde novolak, and triglycidyl ether of trimethylolpropane.

9. A prepolymer according to claim 5, wherein said polyfunctional nitrile compound is selected from the group consisting of orthophthalonitrile, isophthalonitrile, terephthalonitrile, 3-methyl-1,4-dicyanobenzene, 5-isopropyl-1,3-dicyanobenzene, 2,5-dimethyl-1,4-dicyanobenzene, 2-chloro-1,3-dicyanobenzene, 5-bromo-1,4-dicyanobenzene, 5-amino-1,3-dicyanobenzene, 3-nitro-1,2-dicyanobenzene, 2-carboxyl-1,4-dicyanobenzene, 2-dichloromethyl-1,3-dicyanobenzene, 2-ethyl-3-chloro-1,4-dicyanobenzene, 4-hydroxy-1,3-dicyanobenzene, 2-n-octyl-1,4-dicyanobenzene, 3-nitro-1,2-dicyanobenzene, 1,3,5-tricyanobenzene, 2-chloro-1,3,5-tricyanobenzene, 3-fluoro-1,4,5-tricyanobenzene, 6-nitro-1,3,5-tricyanobenzene, 2-hydroxy-3,4,5-tricyanobenzene, 4-methyl-1,3,5-tricyanobenzene, 1,2,4,5-tetracyanobenzene, 3-hydroxy-1,2,4,5-tetracyanobenzene, 2-bromo-1,3,4,5-tetracyanobenzene, 3-nitro-1,2,4,5-tetracyanobenzene, 2-isopropyl-1,3,4,5-tetracyanobenzene, 3-n-pentyl-1,2,4,5-tetracyanobenzene, 5-chloromethyl-2-ethyl-3-chloro-1,4-dicyanobenzene, 4,4'-dicyanobiphenyl, 4,4'-dicyanobiphenyl ether, 4,4'-dicyanobiphenylmethylene, 4,4'-dicyanobiphenylsulfone, 4,4'-dicyanobiphenylsulfide, 1,4-bis(p-phenoxybenzoyl)-2,5-dicyanobenzene, 4,4'-bis[p-(p-cyanobenzoyl)phenoxybenzenesulfonyl]diphenyl ether, 1,3-bis[p-(p-cyanobenzoyl)phenoxybenzoyl]benzene, 1,3-bis[p-(p-cyanobenzoyl)phenoxybenzenesulfonyl]benzene, 1,3-bis(3,4-dicyanophenoxy)benzene, 1,4-bis(3,4-dicyanophenoxy)benzene, 4,4'-bis(3,4-dicyanophenoxy)biphenyl, 4,4'-bis(3,4-dicyanophenoxy)biphenylsulfone, 4,4'-bis(3,4-dicyanophenoxy)biphenylmethane, 4,4'-bis(3,4-dicyanophenoxy)biphenylpropane, and 4,4'-bis(3,4-dicyanophenoxy)biphenylhexafluoropropane.

10. A prepolymer according to claim 5, wherein said polyfunctional epoxy compound is selected from the group consisting of diglycidyl ether of bisphenol A, butadiene diepoxide, 3,4-epoxycyclohexylmethyl-(3,4-epoxy)cyclohexane carboxylate, vinylcyclohexane dioxide, 4,4'-bis(1,2-epoxyethyl)diphenyl ether, 4,4'-bis(1,2-epoxyethyl)biphenyl, 2,2-bis(3,4-epoxycyclohexyl)propane, diglycidyl ether of resorcin, bis(2,3-epoxycyclopentyl)ether, 2-(3,4-epoxy)cycloexane-5,5-spiro(3,4-epoxy)cyclohexane-m-dioxane, bis(3,4-epoxy-6-methylcyclohexyl) adipate, N,N'-m-phenylenebis(4,5-epoxy-1,2-cyclohexane dicarboxyimide), and triglycicyl ether of aminophenol, triglycidyl ether of phloroglucin, triglycidyl ether of methylphloroglucin, polyallyl glycidyl ether, 1,3,5-tri(1,2-epoxyethyl)benzene, 2,2',4,4-tetraglycidoxybenzophenone, tetraglycidoxytetraphenylmethane, polyglycidyl ether of phenolformaldehyde novolak, and triglycidyl ether of trimethylolpropane.

11. A cured product according to claim 6, wherein said polyfunctional nitrile compound is 4,4'-dicyanobiphenylene, terephthalonitrile, 4,4'-bis(3,4-dicyanophenoxy)biphenylmethane, 4,4'-bis(3,4-dicyanophenoxy)biphenylsulfone or 1,4-bis(p-phenoxybenzoyl)-2,5-dicyanobenzene.

12. A cured product according to claim 6, wherein said polyfunctional nitrile compound is selected from the group consisting of orthophthalonitrile, isophthalonitrile, terephthalonitrile, 3-methyl-1,4-dicyanobenzene, 5-isopropyl-1,3-dicyanobenzene, 2,5-dimethyl-1,4-dicyanobenzene, 2-chloro-1,3-dicyanobenzene, 5-bromo-1,4-dicyanobenzene, 5-amino-1,3-dicyanobenzene, 3-nitro-1,2-dicyanobenzene, 2-carboxyl-1,4-dicyanobenzene, 2-dichloromethyl-1,3-dicyanobenzene, 2-ethyl-3-chloro-1,4-dicyanobenzene, 4-hydroxy-1,3-dicyanobenzene, 2-n-octyl-1,4-dicyanobenzene, 3-nitro-1,2-dicyanobenzene, 1,3,5-tricyanobenzene, 2-chloro-1,3,5-tricyanobenzene, 3-fluoro-1,4,5-tricyanobenzene, 6-nitro-1,3,5-tricyanobenzene, 2-hydroxy-3,4,5-tricyanobenzene, 4-methyl-1,3,5-tricyanobenzene, 1,2,4,5-tetracyanobenzene, 3-hydroxy-1,2,4,5-tetracyanobenzene, 2-bromo-1,3,4,5-tetracyanobenzene, 3-nitro-1,2,4,5-tetracyanobenzene, 2-isopropyl-1,3,4,5-tetracyanobenzene, 3-n-pentyl-1,2,4,5-tetracyanobenzene, 5-chloromethyl-2-ethyl-3-chloro-1,4-dicyanobenzene, 4,4'-dicyanobiphenyl, 4,4'-dicyanobiphenyl ether, 4,4'-dicyanobiphenylmethylene, 4,4'-dicyanobiphenylsulfone, 4,4'-dicyanobiphenylsulfide, 1,4-bis(p-phenoxybenzoyl)-2,5-dicyanobenzene, 4,4'-bis[p-(p-cyanobenzoyl)phenoxybenzenesulfonyl]-diphenyl ether, 1,3-bis[p-(p-cyanobenzoyl)phenoxybenzoyl]benzene, 1,3-bis[p-(p-cyanobenzoyl)phenoxybenzenesulfonyl]benzene, 1,3-bis(3,4-dicyanophenoxy)benzene, 1,4-bis(3,4- dicyanophenoxy)benzene, 4,4'-bis(3,4-dicyanophenoxy)biphenyl, 4,4'-bis(3,4-dicyanophenoxy)biphenylsulfone, 4,4'-bis(3,4-dicyanophenoxy)biphenylmethane, 4,4'-bis(3,4-dicyanophenoxy)bipenylpropane, and 4,4'-bis(3,4-dicyanophenoxy)biphenylhexafluoropropane.

13. A cured product according to claim 11, wherein said polyfunctional epoxy compound is selected from the group consisting of diglycidyl ether of bisphenol A, butadiene diepoxide, 3,4-epoxycyclohexylmethyl-(3,4-epoxy)cyclohexane carboxylate, vinylcyclohexene dioxide, 4,4'-bis(1,2-epoxyethyl)diphenyl ether, 4,4'-bis(1,2-epoxyethyl)biphenyl, 2,2-bis(3,4-epoxycyclohexyl)propane, diglycidyl ether of resorcin, bis(2,3-epoxycyclopentyl)ether, 2-(3,4-epoxy)cycloexane-5,5-spiro(3,4-epoxy)cyclohexane-m-dioxane, bis(3,4-epoxy-6-methylcyclohexyl) adipate, N,N'-m-phenylenebis(4,5-epoxy-1,2-cyclohexane dicarboxyimide), and triglycicyl ether of aminophenol, triglycidyl ether of phloroglucin, triglycidyl ether of methylphloroglucin, polyallyl glycidyl ether, 1,3,5-tri(1,2-epoxyethyl)benzene, 2,2',4,4-tetraglycidoxybenzophenone, tetraglycidoxytetraphenylmethane, polyglycidyl ether of phenolformaldehyde novolak, and triglycidyl ether of trimethylolpropane.

14. A thermosetting resin composition according to claim 1, wherein said curing catalyst is selected from the group consisting of boron trifluoride monoethylamine complex, boron trifluoride piperidine complex, boron trifluoride imidazole complex, tetraphenyltin, dibutyltin sulfide, tributyltin acrylate, triphenyltin chloride, hexabutylditin, dibutyldivinyltin, triethyltin chloride, tetraethyltin, dibutyltin diacetate, dioctyltin maleate, triphenyltin hydroxide, tetravinyltin, tributylantimony, tributylantimony oxide, triphenylantimony, triphenylanitimony sulfide, tetraphenyllead, bis(cyclopentadienyl)titanium dichloride, tetraisopropyl titanate, tetra-n-butyl titanate, tetrastearyl titanate, tetra(2-ethylhexyl) titanate, butyl titanate dimer, polytetrabutyl titanate, bis(cyclopentadienyl)zirconium chloride, tetraisopropyl zirconate, tetra-n-butyl zirconate, tetra-n-pentyl zirconate, tetra-n-hexyl zirconate, tetra-n-octyl zirconate, triphenylbismuth, boron trifluoride, anhydrous stannic chloride, anhydrous aluminum chloride, anhydrous ferric chloride, anhydrous phosphorus pentachloride, cupric chloride and titanium tetrachloride.

15. A prepolymer according to claim 5, wherein said curing catalyst is selected from the group consisting of boron trifluoride monoethylamine complex, boron trifluoride piperidine complex, boron trifluoride imidazole complex, tetraphenyltin, dibutyltin sulfide, tributyltin acrylate, triphenyltin chloride, hexabutylditin, dibutyldivinyltin, triethyltin chloride, tetraethyltin, dibutyltin diacetate, dioctyltin maleate, triphenyltin hydroxide, tetravinyltin, tributylantimony, tributylantimony oxide, triphenylanitmony, triphenylantimony sulfide, tetraphenyllead, bis(cyclopentadienyl)titanium dichloride, tetraisopropyl titanate, tetra-n-butyl titanate, tetrastearyl titanate, tetra(2-ethylhexyl) titanate, butyl titanate dimer, polytetrabutyl titanate, bis(cyclopentadienyl)zirconium chloride, tetraisopropyl zirconate, tetra-n-butyl zirconate, tetra-n-pentyl zirconate, tetra-n-hexyl zirconate, tetra-n-octyl zirconate, triphenylbismuth, boron trifluoride, anhydrous stannic chloride, anhydrous aluminum chloride, anhydrous ferric chloride, anhydrous phosphorus pentachloride, cupric chloride and titanium tetrachloride.

16. A thermosetting resin composition comprising
(A) at least one polyfunctional epoxy compound having two or more 1,2-epoxy groups,
(B) at least one polyfunctional nitrile compound having two or more nitrile groups, and
(C) at least one curing catalyst; said polyfunctional nitrile compound being 4,4'-dicyanobiphenylene, terephthalonitrile, 4,4'-bis(3,4-dicyanophenoxy)biphenylmethane, 4,4'-bis(3,4-dicyanophenoxy)biphenylsulfone or 1,4-bis(p-phenoxybenzoyl)-2,5-dicyanobenzene.

* * * * *